United States Patent
Oh et al.

(10) Patent No.: US 12,241,162 B2
(45) Date of Patent: Mar. 4, 2025

(54) ALUMINUM-IRON-PLATED STEEL SHEET, HAVING EXCELLENT MOLD WEAR RESISTANCE, FOR HOT PRESS FORMING, AND MANUFACTURING METHOD THEREOF

(71) Applicant: POSCO, Pohang-si (KR)

(72) Inventors: Jin-Keun Oh, Gwangyang-si (KR); Seong-Woo Kim, Gwangyang-si (KR); Sang-Heon Kim, Gwangyang-si (KR); Hyo-Sik Chun, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/767,643

(22) PCT Filed: Dec. 17, 2020

(86) PCT No.: PCT/KR2020/018554
§ 371 (c)(1),
(2) Date: Apr. 8, 2022

(87) PCT Pub. No.: WO2021/125832
PCT Pub. Date: Jun. 24, 2021

(65) Prior Publication Data
US 2024/0084429 A1    Mar. 14, 2024

(30) Foreign Application Priority Data
Dec. 20, 2019 (KR) ........................ 10-2019-0172334

(51) Int. Cl.
*C22C 21/02* (2006.01)
*C21D 9/46* (2006.01)
(Continued)

(52) U.S. Cl.
CPC .................. *C23C 2/29* (2022.08); *C21D 9/46* (2013.01); *C22C 21/02* (2013.01); *C22C 38/001* (2013.01);
(Continued)

(58) Field of Classification Search
CPC ..... C22C 21/02; C22C 38/001; C22C 38/002; C22C 38/02; C22C 38/04; C22C 38/06; C23C 2/12; C23C 2/40
(Continued)

(56) References Cited

U.S. PATENT DOCUMENTS 6,296,805 B1    10/2001    Laurent et al.
2007/0163685 A1    7/2007    Kusumi et al.
(Continued)

FOREIGN PATENT DOCUMENTS

CN        108474096 A    8/2018
CN        110114492 A    8/2019
(Continued)

OTHER PUBLICATIONS

Kim et al., KR20180074292A Google Patents Machine translation printed Apr. 26, 2024, Jul. 3, 2018, entire translation (Year: 2018).*
(Continued)

*Primary Examiner* — Katherine A Christy
(74) *Attorney, Agent, or Firm* — Morgan, Lewis & Bockius LLP

(57) ABSTRACT

An aluminum-iron-plated steel sheet including a base steel sheet and an aluminum-based plating layer on a surface of the base steel sheet. The aluminum-based plating layer includes an alloyed layer on the surface of the base steel sheet and an aluminum layer on the alloyed layer. The alloyed layer may be formed of one or more of $Fe_3Al$, $FeAl(Si)$, $Fe_2Al_5$, and $FeAl_3$. A thickness of the alloyed layer may be 90% or more of a thickness of the aluminum-based
(Continued)

plating layer. A surface fraction of Ti may be 2% or less and a surface fraction of Zn may be 1% or less, as observed on the surface of the aluminum-based plating layer.

8 Claims, 4 Drawing Sheets

(51) Int. Cl.
    *C22C 38/00*     (2006.01)
    *C22C 38/02*     (2006.01)
    *C22C 38/04*     (2006.01)
    *C22C 38/06*     (2006.01)
    *C23C 2/12*     (2006.01)
    *C23C 2/26*     (2006.01)
    *C23C 2/28*     (2006.01)
    *C23C 2/40*     (2006.01)

(52) U.S. Cl.
    CPC ............ *C22C 38/002* (2013.01); *C22C 38/02* (2013.01); *C22C 38/04* (2013.01); *C22C 38/06* (2013.01); *C23C 2/12* (2013.01); *C23C 2/26* (2013.01); *C23C 2/261* (2022.08); *C23C 2/28* (2013.01); *C23C 2/40* (2013.01)

(58) Field of Classification Search
    USPC ........................................................ 428/653
    See application file for complete search history.

(56) References Cited

U.S. PATENT DOCUMENTS

| | | |
|---|---|---|
| 2019/0003029 A1 | 1/2019 | Oh et al. |
| 2020/0086608 A1 | 3/2020 | Oh et al. |
| 2020/0109464 A1 | 4/2020 | Kim et al. |

FOREIGN PATENT DOCUMENTS

| | | |
|---|---|---|
| CN | 110157973 A | 8/2019 |
| EP | 1160346 A1 | 12/2001 |
| EP | 3396010 A1 | 10/2018 |
| EP | 3561116 A1 | 10/2019 |
| JP | H11-279732 A | 10/1999 |
| JP | 2005-273019 A | 10/2005 |
| JP | 2006-51543 A | 2/2006 |
| JP | 2010-018860 A | 1/2010 |
| JP | 2012-041610 A | 3/2012 |
| JP | 2019-506523 A | 3/2019 |
| KR | 2001-0085282 A | 9/2001 |
| KR | 10-2014-0083814 A | 7/2014 |
| KR | 10-1528011 B1 | 6/2015 |
| KR | 10-1696121 B1 | 1/2017 |
| KR | 20180074292 A * | 7/2018 |
| KR | 10-2018-0131945 A | 12/2018 |
| KR | 10-2019-0077928 A | 7/2019 |
| KR | 10-2019-0078013 A | 7/2019 |
| WO | 00/50658 A1 | 8/2000 |
| WO | 2006/006742 A1 | 1/2006 |

OTHER PUBLICATIONS

Office Action issued in Chinese patent application 202080079753.X dated Mar. 25, 2023.
Office Action issued in Japanese patent application 2022-523536 dated Apr. 18, 2023 with English Translation.
International Search Report dated Jun. 2, 2021 issued in International Patent Application No. PCT/KR2020/018554 (with English translation).
The Extended European Search Report dated Nov. 3, 2022 issued in European Patent Application No. 20901363.0.
Indian Office Action dated Aug. 8, 2022 issued in Indian Patent Application No. 202217022756 (with English translation).

* cited by examiner

[FIG. 1]
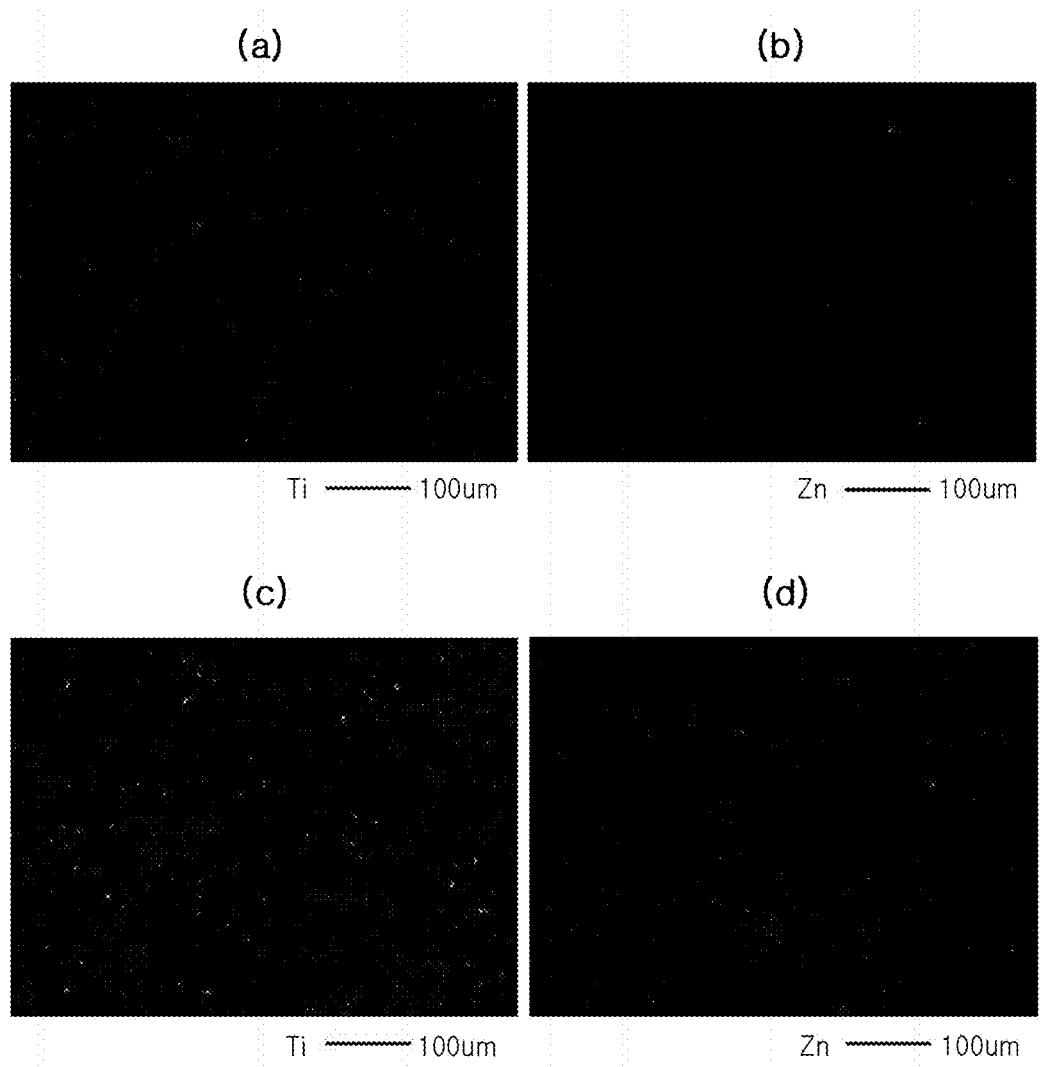

[FIG. 2]
(a)
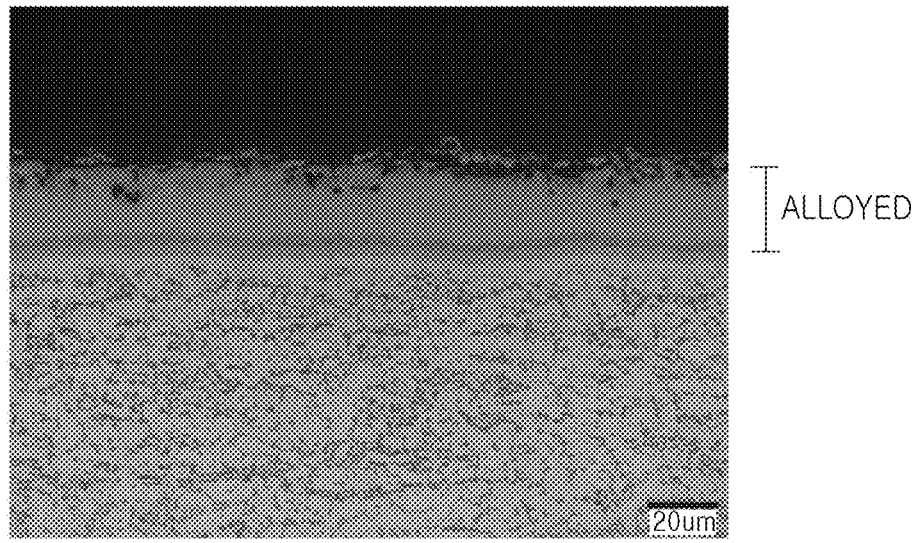
(b)
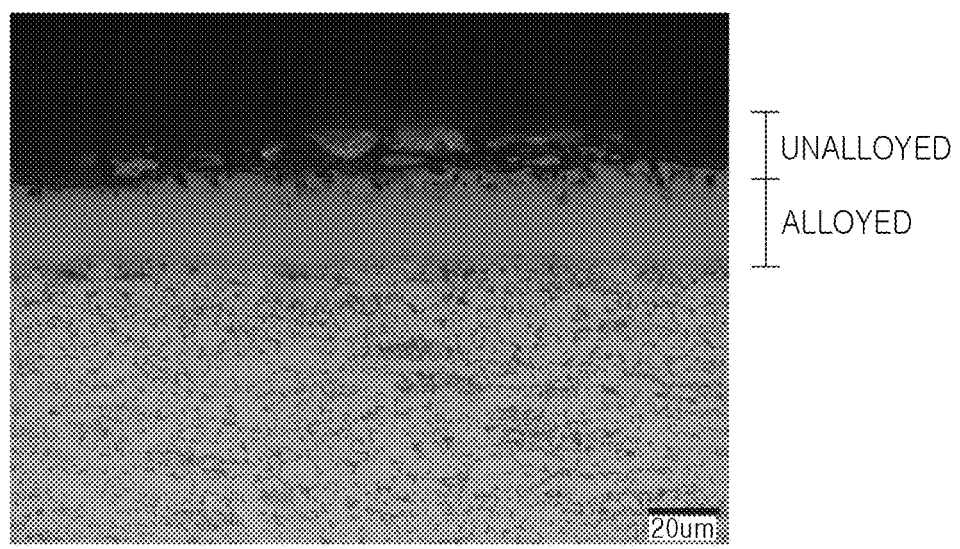

[FIG. 3]
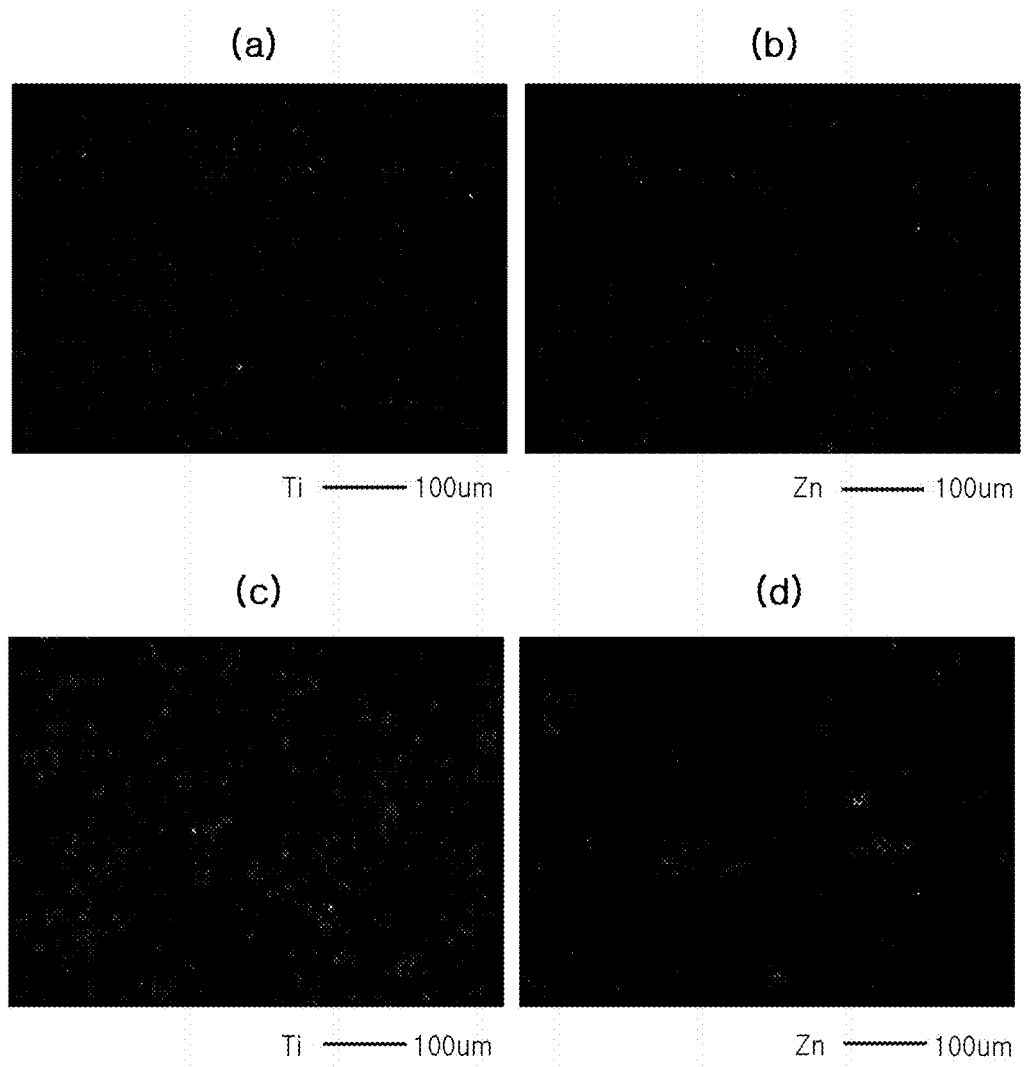

[FIG. 4]
(a)
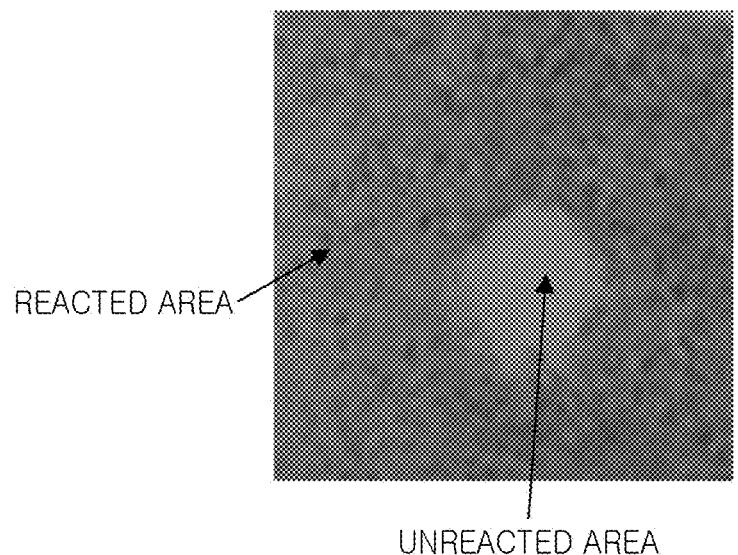
(b)
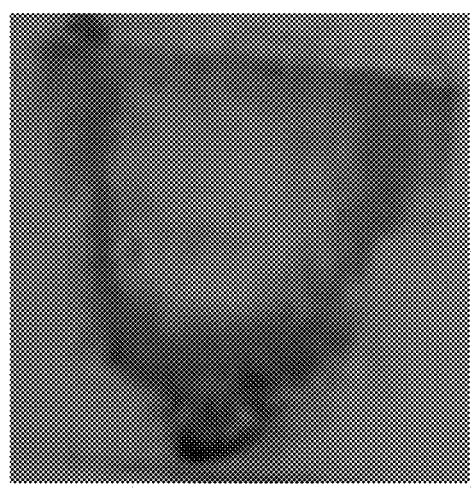

ALUMINUM-IRON-PLATED STEEL SHEET, HAVING EXCELLENT MOLD WEAR RESISTANCE, FOR HOT PRESS FORMING, AND MANUFACTURING METHOD THEREOF

CROSS-REFERENCE OF RELATED APPLICATIONS

This application is the U.S. National Phase under 35 U.S.C. § 371 of International Patent Application No. PCT/KR2020/018554, filed on Dec. 17, 2020, which in turn claims the benefit of Korean Application No. 10-2019-0172334, filed on Dec. 20, 2019, the entire disclosures of which applications are incorporated by reference herein.

TECHNICAL FIELD

The present disclosure relates to an aluminum-iron-based plated steel sheet for hot press and a manufacturing method thereof, and more particularly, to an aluminum-iron-based plated steel sheet for hot press forming, having excellent mold wear resistance, and a manufacturing method thereof.

BACKGROUND ART

In recent years, due to depletion of oil energy resources and high interest in the environment, regulations on car fuel efficiency improvement are getting stricter. In terms of materials, as one method for improving the car fuel efficiency, a thickness of a steel sheet used may be decreased, but when the thickness is decreased, there may be a problem with car stability, and thus, improvement of steel sheet strength should be supported.

For this reason, a demand for a high-strength steel sheet continues to arise, and various kinds of steel sheets were developed. However, since these steel sheets have high strength in themselves, their processability is poor. That is, since a product of strength and elongation of a steel sheet tends to always have a constant value, when steel sheet strength is increased, an elongation which is an indicator of processability is decreased.

In order to solve the problem, a hot press forming method was suggested. The hot press forming method is a method in which a steel sheet is processed at high temperature and quenched at low temperature, thereby forming a low-temperature structure such as martensite to increase the strength of a final product. The method may minimize a processability problem when a member having high strength is produced.

However, since in the hot press forming method, a steel sheet is heated to a high temperature, a steel sheet surface may be oxidized, and thus, a process of removing an oxide on the steel sheet surface after the press forming should be added.

In order to solve the problem, Patent Document 1 uses a steel sheet plated with aluminum in hot press.

Since the steel sheet has an aluminum plating layer on the surface, a base steel sheet may not be oxidized at the time of heating. Besides, the steel sheet is heated for hot press forming of the aluminum plated steel sheet, and in this process, the temperature of the steel sheet may be raised, and as a result, Fe may be diffused from a base steel sheet into a plating layer to cause alloying in the plating layer.

RELATED ART DOCUMENT (Patent Document 1) U.S. Patent Publication No. 6296805

DISCLOSURE

Technical Problem

An aspect of the present disclosure is to provide an aluminum-iron-based plated steel sheet for hot press forming, having excellent mold wear resistance, and a manufacturing method thereof.

An object of the present disclosure is not limited to the above description. A person skilled in the art will have no difficulty in gaining an understanding of further objects of the present disclosure from the overall descriptions of the present specification.

Technical Solution

According to an aspect of the present disclosure, an aluminum-iron-based plated steel sheet includes: a base steel sheet; and an aluminum-based plating layer provided on a surface of the base steel sheet, wherein the aluminum-based plating layer includes an alloyed layer provided on the surface of the base steel sheet and formed of one or more of $Fe_3Al$, $FeAl(Si)$, $Fe_2Al_5$, and $FeAl_3$; and an aluminum layer provided on the alloyed layer, a thickness of the alloyed layer is 90% or more of a thickness of the aluminum-based plating layer, and a surface fraction of Ti is 2% or less and a surface fraction of Zn is 1% or less, as observed on a surface of the aluminum-based plating layer.

The thickness of the aluminum-based plating layer may be 20 to 40 μm and a plating amount on both surfaces may be 20 to 200 $g/m^2$.

The base steel sheet may include, by weight: 0.04 to 0.5% of C, 0.01 to 2% of Si, 0.01 to 10% of Mn, 0.001 to 1.0% of Al, 0.05% or less of P, 0.02% or less of S, and 0.02% or less of N, with a balance of Fe and other unavoidable impurities.

The base steel sheet may further include, by weight, one or more of 0.01 to 4.0% of a sum of one or more selected from the group consisting of Cr, Mo, and W, 0.001 to 0.4% of a sum of one or more selected from the group consisting of Ti, Nb, Zr, and V, 0.005 to 2.0% of Cu+Ni, 0.001 to 1.0% of Sb+Sn, and 0.0001 to 0.01% of B.

On a surface of the steel sheet, a fraction of a circle-equivalent diameter of 4 μm or more of Ti may be 20% or less, and a fraction of a circle-equivalent diameter of 4 μm or more of Zn may be 20% or less.

When the steel sheet is heated at 930° C. for 6 minutes and then is subjected to a high temperature wear test, a pressure sensitive paper reacted area of a mold may be 50% or less.

According to another aspect of the present disclosure, a hot press forming member obtained by hot press molding of an aluminum-iron-based plated steel sheet may be provided.

On a surface of the member, a surface fraction of Ti may be 5% or less, a fraction of a circle-equivalent diameter of 4 μm or more of Ti may be 50% or less, a surface fraction of Zn may be 5% or less, and a fraction of a circle-equivalent diameter of 4 μm or more of Zn may be 50% or less.

According to another aspect of the present disclosure, a manufacturing method of an aluminum-iron-based plated steel sheet includes: preparing a base steel sheet; dipping the base steel sheet in an aluminum plating bath including, by weight, 0.1% or less (including 0%) of Ti and 1% or less (including 0%) of Zn to perform plating; cooling the steel sheet after the plating; performing an alloying heat treatment of the cooled steel sheet at a temperature in a range of 600 to 800° C. for 0.1 to 100 hours in a batch annealing furnace under an oxygen and/or nitrogen atmosphere having a dew-point temperature of lower than −10° C.; cooling the steel sheet after the heat treatment; and removing an oxide on a surface of the cooled steel sheet.

The aluminum plating bath may include, by weight, 7 to 15 wt % of Si with a balance of Al and unavoidable impurities.

The plating may be performed so that a thickness of the plating layer is 20 to 40 μm and a plating amount on both surfaces is 20 to 200 g/m².

The base steel sheet may include, by weight: 0.04 to 0.5% of C, 0.01 to 2% of Si, 0.01 to 10% of Mn, 0.001 to 1.0% of Al, 0.05% or less of P, 0.02% or less of S, and 0.02% or less of N, with a balance of Fe and other unavoidable impurities.

The base steel sheet may further include, by weight, one or more of 0.01 to 4.0% of a sum of one or more selected from the group consisting of Cr, Mo, and W, 0.001 to 0.4% of a sum of one or more selected from the group consisting of Ti, Nb, Zr, and V, 0.005 to 2.0% of Cu+Ni, 0.001 to 1.0% of Sb+Sn, and 0.0001 to 0.01% of B.

After the plating, the cooling may be cooling to 250° C. or lower at an average cooling rate of 3 to 20° C./s.

A process of temper rolling the cooled steel sheet at a temper reduction rate of 0.1 to 1.5% may be further included after the plating.

After the heat treatment, the cooling may be cooling to 400° C. at a cooling rate of 50° C./h or less.

After the heat treatment, when the cooled steel sheet is cooled below 100° C., a process of releasing hydrogen in the batch annealing furnace in a cooling section of 100 to 400° C. may be further included.

According to still another aspect of the present disclosure, a manufacturing method of a hot press forming member includes: heating an aluminum-iron-based plated steel sheet at a temperature in a range of 880 to 950° C. for 3 to 10 minutes and then performing hot press forming.

Advantageous Effects

As set forth above, according to an exemplary embodiment in the present disclosure, an aluminum-iron-based plated steel sheet for hot press forming, having excellent mold wear resistance, and a manufacturing method thereof may be provided.

DESCRIPTION OF DRAWINGS

FIG. 1 is photographs of surfaces of aluminum-iron-based plated steel sheets observed by an electron probe X-ray microanalyzer (EPMA), in which (a) and (b) are photographs of Ti and Zn of Inventive Example 2, and (c) and (d) are photographs of Ti and Zn of Comparative Example 2, respectively.

FIG. 2 is photographs of cross-sections of aluminum-iron-based plated steel sheets observed by an optical microscope, in which (a) is a photograph of Inventive Example 2 and (b) is a photograph of Comparative Example 1.

FIG. 3 is photographs of surfaces of steel sheets after hot press forming aluminum-iron-based plated steel sheets, observed by EPMA, in which (a) and (b) are photographs of Ti and Zn of Inventive Example 2, and (c) and (d) are photographs of Ti and Zn of Comparative Example 3, respectively.

FIG. 4 is photographs obtained by heating aluminum-iron-based plated steel sheets at 930° C. for 6 minutes, performing a high temperature wear test at 700° C., and transcribing the worn tool to pressure sensitive paper, in which (a) is a photograph of Comparative Example 3 and (b) is a photograph of Inventive Example 2.

BEST MODE FOR INVENTION

Hereinafter, preferred exemplary embodiments in the present disclosure will be described. The exemplary embodiments in the present disclosure may be modified in various forms, and the scope of the disclosure should not be interpreted to be limited to the exemplary embodiments set forth below. These exemplary embodiments are provided in order to describe the present disclosure in more detail to those with ordinary skill in the art to which the present disclosure pertains.

The present inventors confirmed that in previously forming an aluminum plating layer on a surface of a base steel sheet before heating for hot press forming, contents of Ti and Zn as a composition of a plating bath are controlled and also alloying heat treatment and removal of a surface oxide are performed, thereby improving mold wear resistance of a hot press forming member, and thus, completed the present disclosure.

Hereinafter, the present disclosure will be described in detail.

Hereinafter, the steel sheet of the present disclosure will be described in detail.

The aluminum-iron-based plated steel sheet according to an aspect of the present disclosure may include a base steel sheet and an aluminum-based plating layer, and the aluminum-based plating layer may include an alloyed layer and an aluminum layer.

The aluminum-iron-based plated steel sheet of the present disclosure may include a base steel sheet and an aluminum-based plating layer provided on a surface of the base steel sheet, and the aluminum-based plating layer may include an alloyed layer formed of one or more of $Fe_3Al$, $FeAl(Si)$, $Fe_2Al_5$, and $FeAl_3$ and an aluminum layer provided on the alloyed layer.

When aluminum is plated on the base steel sheet and then an alloying heat treatment is performed, Fe of the base steel sheet diffuses to an aluminum plating layer. Here, since Fe diffuses from the base steel sheet to the plating layer, the amount of diffused Fe is small on the outermost surface of the plated steel sheet and there may be an aluminum layer purely formed of aluminum, and an alloyed layer formed of intermetallic compounds of Al and Fe may be formed between the aluminum layer and the base steel sheet. Without being limited thereto, an Al—Fe-based intermetallic compound alloying phase forming the alloyed layer may be $Fe_3Al$, $FeAl(Si)$, $Fe_2Al_5$, and $FeAl_3$.

Meanwhile, on the outermost surface side of the aluminum-based plating layer, that is, on the alloyed layer in the aluminum-based plating layer, an aluminum layer purely formed of aluminum may be formed, and a thickness of the alloyed layer may be less than 10% of a thickness of the aluminum-based plating layer.

Since an interface between the aluminum layer and the alloyed layer is unstable in the plated steel sheet, when the thickness of the aluminum layer is more than 10% of the thickness of the aluminum-based plated thickness, delamination of the aluminum layer may occur in a leveling process for coiling and/or shape correction after the alloying heat treatment. Since a smaller thickness of the aluminum layer is preferred, the lower limit may not be limited. Therefore, in the present disclosure, the thickness of the aluminum layer may be less than 5%, more preferably less than 1% of the thickness of the aluminum-based plating layer.

The thickness of the aluminum-based plating layer may be 20 to 40 μm.

When the thickness of the plating layer is less than 20 μm, corrosion resistance is inferior, and when the thickness is more than 40 μm, weldability is poor. Therefore, the thickness of the aluminum-based plating layer may be 20 to 40 μm, and more preferably 25 to 35 μm.

A plating amount in aluminum plating may be 20 to 100 g/m² based on one surface.

When the plating amount is less than 20 g/m², corrosion resistance is inferior, and when the plating amount is more than 100 g/m², weldability is poor. Therefore, the plating amount may be 20 to 100 g/m² based on one surface. It may be more preferably 40 to 90 g/m², and more preferably 60 to 80 g/m².

The base steel sheet of the present disclosure is a steel plate for hot press forming, and when it is used for hot press forming, it may not be particularly limited. In the present disclosure, the base steel sheet may include, by weight: 0.04 to 0.5% of C, 0.01 to 2% of Si, 0.01 to 10% of Mn, 0.001 to 1.0% of Al, 0.05% or less of P, 0.02% or less of S, and 0.02% or less of N, with a balance of Fe and other unavoidable impurities.

Carbon (C): 0.04 to 0.5%

Carbon (C) is an element essential to increase strength of a heat treating member, and in order to sufficiently secure the strength of the heat treatment member, carbon should be added at 0.04% or more. However, in the case in which the content is more than 0.5%, when a cold-rolled material is produced, cold rolling properties become greatly inferior and spot weldability is greatly deteriorated.

Therefore, a content of carbon (C) may be 0.04 to 0.5%. More preferably, the lower limit may be 0.1%. In addition, the upper limit may be more preferably 0.45%, and still more preferably 0.4%.

Silicon (Si): 0.01 to 2%

Silicon (Si) serves as a deoxidizer in steelmaking and also serves to suppress production of carbides which have the greatest influence on strength of the hot press forming member. Silicon (Si) should be added at 0.01% or more, in order to concentrate carbon with martensite lath grain boundary after producing martensite to secure residual austenite. However, the upper limit may be 2%, in order to secure sufficient plating properties when performing aluminum plating on a steel sheet after rolling.

Therefore, a content of silicon (Si) may be 0.01 to 2%. More preferably, the upper limit may be 1.5%.

Manganese (Mn): 0.01 to 10%

Manganese (Mn) may be added at 0.01% or more, in order to secure a solid solution strengthening effect and also to lower a critical cooling rate for securing martensite. However, the upper limit is 10%, so that the strength of the steel sheet is appropriately maintained to secure hot press forming process workability, reduce manufacturing costs, and improve spot weldability.

Therefore, a content of manganese (Mn) may be 0.01 to 10%. More preferably, the upper limit may be 9%, and still more preferably 8%.

Aluminum (Al): 0.001 to 1.0%

Aluminum (Al) should be added at 0.001% or more, since it performs deoxidation with Si in steelmaking to increase cleanliness of steel. However, the upper limit is 1.0%, so that an Ac3 temperature is not excessively raised to perform heating required in the hot press forming in an appropriate temperature range.

Therefore, a content of aluminum (Al) may be 0.001 to 1.0%.

Phosphorus (P): 0.05% or Less

Phosphorus (P) is an impurity present in steel, a lower content is more advantageous, and thus, phosphorus should be added at 0.05% or less.

Therefore, the content of phosphorus (P) may be 0.05% or less, and more preferably 0.03% or less. However, the manufacturing costs may be increased for excessively lowering the content of phosphorus (P), the lower limit may be 0.001%.

Sulfur (S): 0.02% or Less

Sulfur (S) is an impurity present in steel and an element impairing ductility, impact properties, and weldability of a member, and should be added at 0.02% or less.

Therefore, a content of sulfur (S) may be 0.02% or less, and more preferably 0.01% or less. However, when the content is less than 0.0001%, the manufacturing costs may be increased, and thus, the lower limit may be 0.0001%.

Nitrogen (N): 0.02% or Less

Nitrogen (N) is an element included as an impurity in steel and decreases sensitivity for crack occurrence in slab continuous casting, and since a lower content is more advantageous for securing impact properties, nitrogen is added at 0.02% or less.

Therefore, the content of nitrogen (N) may be 0.02% or less. However, the lower limit may be 0.001% considering a rise in manufacturing costs.

In the present disclosure, the base steel sheet may further include, by weight, one or more of 0.01 to 4.0% of a sum of one or more selected from the group consisting of Cr, Mo, and W 0.001 to 0.4% of a sum of one or more selected from the group consisting of Ti, Nb, Zr, and V, 0.005 to 2.0% of Cu+Ni, 0.001 to 1.0% of Sb+Sn, and 0.0001 to 0.01% of B, optionally, if necessary, in addition to the alloy composition described above.

Sum of One or More Selected from the Group Consisting of Cr, Mo, and W: 0.01 to 4.0%

Cr, Mo, and W are elements for improving hardenability, securing strength by a precipitation enhancement effect, and securing grain refinement, and one or more of these may be added at 0.01% or more as the sum of the contents. However, in order to secure weldability of a hot press forming member, the content may be limited to 4.0% or less. In addition, when the sum of contents of these elements is more than 4.0%, the effects described above may be saturated.

Therefore, the sum of one or more selected from the group consisting of Cr, Mo, and W may be 0.01 to 4.0%.

Sum of One or More Selected from the Group Consisting of Ti, Nb, Zr, and V: 0.001 to 0.4%

Ti, Nb, Zr, and V are effective in member strength improvement by forming fine precipitates and residual austenite stabilization and impact toughness improvement by grain refinement, and thus, one or more of these may be added at 0.001% or more as the sum of contents. However, when the content is more than 0.4%, the effect described above is saturated and a manufacturing cost rise may be caused due to excessive alloy addition.

Therefore, the sum of one or more selected from the group consisting of Ti, Nb, Zr, and V may be 0.001 to 0.4%.

Cu+Ni: 0.005 to 2.0%

Cu and Ni are elements forming fine precipitates to improve strength, and in order to obtain the effect, may be added at 0.005% or more as the sum of one or more components of these. However, when the content is more than 2.0%, costs may be increased.

Therefore, the content of Cu+Ni may be 0.005 to 2.0%.

Sb+Sn: 0.001 to 1.0%

Sb and Sn may suppress formation of an Si or Mn oxide concentrated on the surface in an annealing heat treatment for Al—Si plating, thereby improving plating properties. In order to obtain the effect described above, these may be added at 0.001% or more as the sum of one or more of these. However, when the content is more than 1.0%, costs are increased due to excessive alloy addition, and solid solubilization in slab grain boundary occurs to cause coil edge cracks during hot rolling.

Therefore, the content of Sb+Sn may be 0.001 to 1.0%.

B: 0.0001 to 0.01%

Since B is an element which may improve hardenability even with a small amount of addition and be segregated in an old austenite grain boundary to suppress brittleness of a hot press forming member by a P or S grain boundary segregation, and thus, should be added at 0.0001% or more. However, when the content is more than 0.01%, the effect described above is saturated and the brittleness is caused in hot rolling.

Therefore, the content of B may be 0.0001 to 0.01%. More preferably, the upper limit may be 0.005%.

The steel sheet of the present disclosure may include a balance of iron (Fe) and unavoidable impurities, in addition to the composition described above. Since the unavoidable impurities may be incorporated unintentionally in a common manufacturing process, they may not be excluded. Since these impurities are known to any person skilled in the common steel manufacturing field, the entire contents are not particularly mentioned in the present specification.

The aluminum-iron-based plated steel sheet according to an aspect of the present disclosure may have a surface fraction of Ti of 2% or less and a fraction of a circle-equivalent diameter of 4 μm or more of Ti of 20% or less, and a surface fraction of Zn of 1% or less and a fraction of a circle-equivalent diameter of 4 μm or more of Zn of 20% or less, on a surface of the steel sheet.

Ti and Zn form oxides, and a Ti oxide and a Zn oxide lower wear resistance. In the present disclosure, the surface fractions of Ti and Zn affecting wear resistance are controlled, thereby securing mold wear resistance being targeted. The surface fraction of Ti is limited to 2% or less and the surface fraction of Zn is limited to 1% or less, as observed on the surface of the aluminum-iron-based plated steel sheet. In addition, the fractions of a circle-equivalent diameter of 4 μm or more of Ti and Zn are limited to 20% or less, respectively. The oxide which is formed excessively large by 4 μm or more may be a main cause to lower mold wear resistance.

The aluminum-iron-based plated steel sheet of the present disclosure may be hot press formed to manufacture a hot press forming member. On a surface of the member, a surface fraction of Ti may be 5% or less, a fraction of a circle-equivalent diameter of 4 μm or more of Ti may be 50% or less, a surface fraction of Zn may be 5% or less, and a fraction of a circle-equivalent diameter of 4 μm or more of Zn may be 50% or less.

In order to secure the mold wear resistance properties targeted in the present disclosure, the surface fraction of Ti is limited to 5% or less and the surface fraction of Zn is limited to 5% or less, as observed on the surface of the member. In addition, the fractions of a circle-equivalent diameter of 4 μm or more of Ti and Zn are limited to 50% or less, respectively. The oxide which is formed excessively large by 4 μm or more may be a cause to lower mold wear resistance.

Hereinafter, a manufacturing method of a steel sheet of the present disclosure will be described in detail.

The aluminum-iron-based plated steel sheet according to an aspect of the present disclosure may be manufactured by subjecting a base steel sheet satisfying the alloy composition described above to aluminum plating, cooling, temper rolling, alloying heat treatment, cooling, hydrogen release, and oxide removal.

Aluminum Plating

A base steel sheet satisfying the alloy composition described above may be dipped in an aluminum plating bath including: 0.1% or less (including 0%) of Ti, 1% or less (including 0%) of Zn, and 7 to 15% of Si with a balance of Al to plate the steel sheet with aluminum at a thickness of 20 to 40 μm at a plating amount of 20 to 100 g/m$^2$ based on one surface.

If necessary, an annealing treatment may be optionally performed for the steel sheet before plating.

The plating bath may include 7 to 15% of Si. Si serves to form uniform alloying with Fe in a plating layer, and in order to obtain the effects described above, may be included at 7% or more. However, since Si also serves to suppress Fe diffusion, when the content is more than 15%, Fe diffusion is excessively suppressed, so that the alloying structure targeted in the present disclosure may not be obtained. Therefore, the content of Si may be 7 to 15%. More preferably, the content of Si may be 8 to 12%, and more preferably 8 to 10%.

The plating bath may include: 0.1% or less (including 0%) of Ti and 1% or less of Zn (including 0%). In the present disclosure, Ti and Zn may be inevitably included in the plating bath, and thus, the content may be controlled for securing mold wear resistance. When the Ti content is more than 0.1%, Ti in the plating layer diffuses to the surface during the heat treatment and the hot press forming and is bonded to oxygen to form a Ti oxide, thereby lowering mold wear resistance. In addition, when the Zn content is more than 1%, Zn in the plating layer diffuses to the surface during the heat treatment and the hot press forming and is bonded to oxygen to form a Zn oxide, thereby lowering mold wear resistance.

The thickness of the plating layer may be 20 to 40 μm. When the thickness of the plating layer is less than 20 μm, corrosion resistance is inferior, and when the thickness is more than 40 μm, weldability is poor. Therefore, the thickness of the plating layer may be 20 to 40 μm, and more preferably 25 to 35 μm.

A plating amount in aluminum plating may be 20 to 100 g/m$^2$ based on one surface. When the plating amount is less than 20 g/m$^2$, corrosion resistance is inferior, and when the plating amount is more than 100 g/m$^2$, weldability is poor. Therefore, the plating amount may be 20 to 100 g/m$^2$ based on one surface. It may be more preferably 40 to 90 g/m$^2$, and more preferably 60 to 80 g/m$^2$.

Cooling

After the aluminum plating, cooling may be performed to 250° C. or lower at an average cooling rate 3 to 20° C./s.

After the aluminum plating, cooling may be performed to 250° C. or lower. When a cooling end temperature is higher than 250° C., a life of a top roll may be significantly reduced.

After the aluminum plating, the cooling rate may affect an Al—Si crystallization phase in the plating layer and diffusion suppression layer formation, which affects the aluminum layer after the alloying heat treatment. When the aluminum plating, the cooling rate is more than 20° C./s or more, a diffusion suppression layer is not uniformly formed and alloying behavior of a coil in the heat treatment performed layer becomes non-uniform, thereby obtaining phases other than the phases to be obtained in the present disclosure. However, the cooling rate is less than 3° C./s, an Al—Si crystallization phase formed coarsely and plating layer alloying becomes non-uniform in the heat treatment performed layer, thereby obtaining phases other than the phases to be obtained in the present disclosure.

Temper Rolling

Before winding the cooled steel sheet, temper rolling may be performed at a reduction rate of 0.1 to 1.5%.

In the alloying heat treatment process performed layer, in order to induce alloying of the plating layer targeted in the present disclosure and secure surface quality, the reduction rate may be 0.1 to 1.5%.

Alloying Heat Treatment

The aluminum-plated steel plate may be subjected to an alloying heat treatment at a temperature in a range of 600 to 800° C. for 0.1 to 100 hours in a batch annealing furnace under an oxygen and/or nitrogen having a dew point temperature of lower than −10° C.

The aluminum plated steel sheet may be heated in the batch annealing furnace. At this time, the heating atmosphere plays a very important role in the present disclosure. When the steel sheet is heat-treated under hydrogen and/or nitrogen atmosphere, in the case in which the dew point temperature is −10° C. or higher, Ti and Zn in the plating layer may diffuse to the surface of the steel sheet and form an oxide, and the oxide may reduce high-temperature wear resistance properties in the hot press forming.

The aluminum plated steel sheet may be maintained at a temperature in a range of 600 to 800° C. for 0.1 to 100 hours (in the present disclosure, the highest temperature reached by the furnace in the temperature range is the heating temperature). Here, the maintenance time refers to a time to start of cooling after the atmosphere temperature reaches a target temperature. When the heating temperature is lower than 600° C., alloying is not sufficiently performed, and thus, an unalloyed aluminum layer has a thickness of more than 10% of a plating layer thickness in an outermost layer of the plating layer, so that the plating layer may be delaminated during roll leveling. However, in order to prevent excessive production of an oxide on the surface layer of the steel sheet and secure spot weldability, the upper limit may be 800° C.

In order to sufficiently secure the alloyed layer and also prevent reduction of productivity, the maintenance time may be 0.1 to 100 hours. When the maintenance time is more than 100 hours, the diffusion layer is excessively grown, so that the spot weldability of the hot press forming member becomes inferior. More preferably, the maintenance time may be 0.5 to 50 hours. The temperature of the steel sheet may have a heating pattern in a form in which the temperature continues to rise until it reaches the heating temperature, without a cooling process.

A temperature difference between the atmosphere of the batch annealing furnace and the steel sheet may be 1 to 50° C. General heating of the batch annealing furnace is heating of the steel sheet by a temperature rise of the atmosphere in the batch annealing furnace, rather than direct heating of the steel sheet (coil). In this case, a temperature difference between the atmosphere and the steel sheet is unavoidable, but in order to minimize a material and plating quality deviation depending on the position in the steel sheet, the temperature difference between the atmosphere and the steel sheet may be 50° C. or lower, based on the time when the heat treatment target temperature is reached. Ideally, the temperature difference is as small as possible, but this slows the heating rate, so that it may be difficult to satisfy the entire average heating rate conditions, and thus, the lower limit of the temperature difference may be 1° C. Here, the temperature of the steel sheet refers to a temperature measured on a bottom portion of the steel sheet loaded (the lowest portion of the coil), and the temperature of the atmosphere refers to a temperature measured in a center of a heating furnace interior space.

Cooling

After the heat treatment, cooling may be performed to 400° C. at a cooling rate 50° C./h or less.

After the heat treatment, the aluminum plated steel sheet may be cooled by applying various methods such as furnace cooling, air cooling, and water cooling. Upon cooling, an average cooling rate is not particularly limited, and rapid cooling is fine for improving productivity. However, in order to prevent sticking defects, secure material uniformity, and sufficiently form pores, the cooling may be performed to 400° C. at a cooling rate of 50° C./h or less. The lower limit of the cooling rate is not particularly limited, but may be 1° C./h or more considering productivity.

Hydrogen Release

When the aluminum-iron-based plated steel sheet is cooled to lower than 100° C., hydrogen in the furnace may be released in a section of 100 to 400° C.

Even in the case in which the aluminum plated steel sheet is batch annealed under the hydrogen and/or nitrogen atmosphere, a small amount of moisture remains in the furnace, and hydrogen may be incorporated into steel by surface oxidation in a batch annealing process. The hydrogen incorporated as such remains later even in a hot press forming process and promotes hydrogen delayed fracture of a final part. In order to suppress this, when the steel sheet is cooled to lower than 100° C., it is important for the furnace atmosphere at the section of 100 to 400° C. to have almost no hydrogen, so that hydrogen in the steel is released. When a hydrogen release initiation temperature is higher than 400° C., more hydrogen may be released, but workability and productivity may be deteriorated due to too high temperature. However, when the temperature is lower than 100° C., thermal activation energy is small, so that there is less contribution to hydrogen release.

Oxidation Removal

An oxide formed on the surface of the aluminum-iron-based plated steel sheet may be removed.

Though the atmosphere in the batch annealing furnace is controlled, on the surface of the aluminum-iron-based plated steel sheet, Ti and Zn oxides are formed by Ti and Zn diffusion to the surface of the plating layer, causing mold wear in the hot press forming process. In order to solve the problem, surface oxidation is minimized by Ti and Zn content control in the plating layer, a batch annealing furnace temperature, time and atmosphere control, and the like, and additionally, when a process of removing a surface oxide produced is added, mold wear may be suppressed more effectively. As a method of removing a surface oxide, various methods may be used, and thus, it is not particularly limited, but as an example, a method of removing Ti and Zn oxides on the steel sheet surface using a roll brush may be used.

Hot Press Forming

The aluminum-iron-based plated steel sheet of the present disclosure manufactured as described above may be subjected to hot press forming to manufacture a hot press forming member. Here, the hot press forming may use a common method, and in the present disclosure, heating is performed at a temperature in a range of 880 to 950° C. for 3 to 10 minutes and then a press is used to perform hot forming to a desired shape. However, the present disclosure is not limited thereto.

The aluminum-iron-based plated steel sheet of the present disclosure manufactured as described above is heated at 930° C. for 6 minutes, and then placed between molds, thereby providing excellent mold wear resistance properties of a pressure sensitive paper reacted area of the mold of 50% or less after a high temperature friction/wear test.

Hereinafter, the present disclosure will be specifically described through the following Examples. However, it should be noted that the following examples are only for describing the present disclosure in detail by illustration, and not intended to limit the right scope of the present disclosure.

MODE FOR INVENTION

Examples

Base steel sheets having the compositions of Table 1 were prepared, and plating was performed with the plating bath compositions and the plating amounts shown in Table 2. At this time, as the plating bath, an aluminum plating bath including 7 to 15% of Si in addition to Ti and Zn with a balance of Al was used. After the plating, cooling satisfied the conditions of cooling to 250° C. or lower at an average cooling rate of 3 to 20° C./s, suggested in the present disclosure.

TABLE 1

| Element | C | Si | Mn | Al | P | S | N | Cr | Ti | B |
|---|---|---|---|---|---|---|---|---|---|---|
| Content (wt %) | 0.22 | 0.21 | 1.17 | 0.02 | 0.01 | 0.003 | 0.0047 | 0.3 | 0.02 | 0.0021 |

TABLE 2

| Steel type | Plating amount on both surfaces (g/m²) | Plating bath composition (wt %) | |
|---|---|---|---|
| | | Ti | Zn |
| A | 150 | 0.006 | 0.06 |
| B | 40 | 0.045 | 0.38 |
| C | 146 | 0.09 | 0.91 |
| D | 154 | 0.067 | 1.6 |
| E | 152 | 0.24 | 0.09 |
| F | 150 | 0.18 | 1.3 |

The plated steel sheet manufactured was heat-treated under the alloying heat treatment conditions shown in Table 3 and then cooled to 400° C. at a cooling rate of 50° C./h or less, and a process of releasing hydrogen was applied. Thereafter, a thickness ratio of the alloyed layer in the plating layer of the cooled steel sheet was measured, and surface fractions and fractions of a diameter of 4 μm or more of Ti and Zn were measured and are shown in Table 3.

TABLE 3

| Specimen No. | Steel type | Alloying heat treatment | | | Oxide removal Surface cleaning | Alloying layer thickness ratio (%) | Ti | | Zn | | Classification |
|---|---|---|---|---|---|---|---|---|---|---|---|
| | | Heating temperature (° C.) | Heating time (Hr) | Dew point temperature (° C.) | | | Surface fraction (%) | Fraction of diameter of 4 μm or more (%) | Surface fraction (%) | Fraction of diameter of 4 μm or more (%) | |
| 1 | A | 700 | 10 | −50 | o | 99 | 0.19 | 3.4 | 0.04 | 12.5 | Inventive Example 1 |
| 2 | A | 570 | 72 | −50 | o | 80 | 0.12 | 2.9 | 0.03 | 9.5 | Comparative Example 1 |
| 3 | B | 620 | 72 | −25 | o | 100 | 1.54 | 13.5 | 0.48 | 15.6 | Inventive Example 2 |
| 4 | B | 620 | 72 | −25 | x | 100 | 2.89 | 31.5 | 2.74 | 35.8 | Comparative Example 2 |
| 5 | B | 620 | 72 | 10 | o | 100 | 2.31 | 23.5 | 1.28 | 26.1 | Comparative Example 3 |
| 6 | C | 780 | 1 | −45 | o | 93 | 1.78 | 17.5 | 0.84 | 16.3 | Inventive Example 3 |
| 7 | C | 850 | 1 | −45 | o | 100 | 2.29 | 24.7 | 1.19 | 23.4 | Comparative Example 4 |
| 8 | C | 750 | 140 | −45 | o | 100 | 2.57 | 28.1 | 1.93 | 29.4 | Comparative Example 5 |

TABLE 3-continued

| | | Alloying heat treatment | | | Oxide removal Surface cleaning | Alloying layer thickness ratio (%) | Ti | | Zn | | |
|---|---|---|---|---|---|---|---|---|---|---|---|
| | | | | | | | Surface fraction (%) | Fraction of diameter of 4 μmor more (%) | Surface fraction (%) | Fraction of diameter of 4 μmor more (%) | |
| Specimen No. | Steel type | Heating temperature (° C.) | Heating time (Hr) | Dew point temperature (° C.) | | | | | | | Classification |
| 9 | C | — | — | — | x | 9 | 1.87 | 5.2 | 0.89 | 15.8 | Comparative Example 6 |
| 10 | D | 700 | 10 | −50 | ○ | 100 | 1.58 | 4.7 | 1.75 | 25.1 | Comparative Example 7 |
| 11 | E | 700 | 10 | −50 | ○ | 100 | 3.5 | 25.7 | 0.05 | 11.4 | Comparative Example 8 |
| 12 | F | 700 | 10 | −50 | ○ | 100 | 2.4 | 20.8 | 1.54 | 22.7 | Comparative Example 9 |

The steel sheets of Table 3 were subjected to hot press forming shown in Table 4 to obtain a hot press forming member. The surface fractions and fractions of a diameter of 4 μm or more of Ti and Zn of the members were measured. In addition, in order to confirm the wear properties, a pressure sensitive paper reacted area was measured. In the pressure sensitive paper reaction test, the aluminum-iron-based plated steel sheet was heated under hot forming heating conditions and placed between molds, a drawing friction test was performed 10 times at a temperature in a range of 700 to 800° C., and a pressure sensitive paper was placed between the molds and pressed with a pressure of 5 MPa, and then a reacted area was measured by an image analyzer. At this time, as the pressure sensitive paper reacted area become 100%, it means that adhesive wear occurrence decreased and abrasive wear occurrence increased in the high friction/wear test.

As shown in Tables 1 to 4, Inventive Examples 1 to 3 satisfied all of the plating bath composition, the plating amount, and the manufacturing conditions suggested in the present disclosure, thereby securing the physical properties targeted in the present disclosure.

FIG. 1 is photographs of surfaces of aluminum-iron-based plated steel sheets observed by an electron probe X-ray microanalyzer (EPMA), in which (a) and (b) are photographs of Ti and Zn of Inventive Example 2, and (c) and (d) are photographs of Ti and Zn of Comparative Example 2, respectively. In (c) and (d), it was confirmed that Ti and Zn were excessively observed, respectively.

FIG. 2 is photographs of cross-sections of aluminum-iron-based plated steel sheets observed by an optical microscope, in which (a) is a photograph of Inventive Example 2 and (b) is a photograph of Comparative Example 1. It was confirmed

TABLE 4

| | | Hot press forming | | Ti | | Zn | | Wear properties | |
|---|---|---|---|---|---|---|---|---|---|
| | | | | Surface fraction (%) | Fraction of diameter of 4 μmor more (%) | Surface fraction (%) | Fraction of diameter of 4 μmor more (%) | Pressure sensitive reaction area (%) | |
| Specimen No. | Steel type | Heating temperature (° C.) | Heating time (min) | | | | | | Classification |
| 1 | A | 930 | 6 | 0.85 | 4.5 | 0.08 | 16.8 | 21.2 | Inventive Example 1 |
| 2 | A | 930 | 6 | 0.65 | 3.7 | 0.06 | 11.7 | 18.4 | Comparative Example 1 |
| 3 | B | 930 | 6 | 3.86 | 13.5 | 2.71 | 28.4 | 27.5 | Inventive Example 2 |
| 4 | B | 930 | 6 | 8.75 | 68.2 | 8.40 | 70.2 | 84.1 | Comparative Example 2 |
| 5 | B | 930 | 6 | 7.58 | 57.4 | 5.47 | 61.4 | 72.7 | Comparative Example 3 |
| 6 | C | 930 | 6 | 4.31 | 23.5 | 3.89 | 35.7 | 38.6 | Inventive Example 3 |
| 7 | C | 930 | 6 | 5.46 | 59.6 | 5.24 | 58.4 | 61.7 | Comparative Example 4 |
| 8 | C | 930 | 6 | 6.84 | 61.7 | 6.84 | 65.7 | 68.1 | Comparative Example 5 |
| 9 | C | 930 | 6 | 4.48 | 9.4 | 4.21 | 32.2 | 45.4 | Comparative Example 6 |
| 10 | D | 930 | 6 | 4.02 | 7.4 | 6.31 | 59.7 | 53.9 | Comparative Example 7 |
| 11 | E | 930 | 6 | 10.75 | 61.4 | 0.11 | 18.9 | 91.8 | Comparative Example 8 |
| 12 | F | 930 | 6 | 7.95 | 54.2 | 5.75 | 54.1 | 57.8 | Comparative Example 9 | in (b) that the heating temperature was out of the range of the present disclosure, so that an unalloyed layer was excessively formed.

FIG. 3 is photographs of surfaces of steel sheets after hot press forming aluminum-iron-based plated steel sheets, observed by EPMA, in which (a) and (b) are photographs of Ti and Zn of Inventive Example 2, and (c) and (d) are photographs of Ti and Zn of Comparative Example 3, respectively. In (c) and (d), it was confirmed that Ti and Zn were excessively observed, respectively.

FIG. 4 is photographs obtained by heating aluminum-iron-based plated steel sheets at 930° C. for 6 minutes, performing a high temperature wear test at 700° C., and transcribing the worn tool to pressure sensitive paper, in which (a) is a photograph of Comparative Example 3 and (b) is a photograph of Inventive Example 2. In (a), it was confirmed that the reacted area was observed to be larger than an unreacted area.

In Comparative Example 1 in which the alloying heat treatment heating temperature was out of the range of the present disclosure, the heating temperature did not reach the temperature range of the present disclosure so that alloying did not sufficiently occur, and thus, the alloyed layer thickness ratio was not satisfied as shown in FIG. 2.

In Comparative Example 2 in which the surface oxide was not removed after the alloying heat treatment, an oxide was present on the surface of the aluminum-iron-based plated steel sheet, and the surface fractions and the ratios of a diameter of 4 μm or more of Ti and Zn targeted in the present disclosure were not satisfied. Thus, the mold wear resistance was reduced, so that the pressure sensitive paper reacted area range of the present disclosure was not satisfied.

In Comparative Example 3 in which the dew point which was alloying heat treatment conditions did not satisfy the range of the present disclosure, oxides due to Ti and Zn diffusion to the steel sheet surface were excessively formed, and the surface fractions and the ratios of a diameter of 4 μm or more of Ti and Zn targeted in the present disclosure were not satisfied, and thus, it was found that mold wear resistance became poor.

In Comparative Example 4 in which the alloying heat treatment heating temperature was out of the range of the present disclosure, the heating was performed at a higher temperature than the temperature range of the present disclosure to excessively form the oxide on the surface layer, and the surface fractions and the ratios of a diameter of 4 μm or more of Ti and Zn targeted in the present disclosure were not satisfied, and thus, mold wear resistance was reduced.

In Comparative Example 5 in which the alloying heat treatment time was out of the range of the present disclosure, the surface fractions and the ratios of a diameter of 4 μm or more of Ti and Zn targeted in the present disclosure were not satisfied due to excessively long heating. As a result, it was confirmed that mold wear resistance was reduced.

In Comparative Example 6 in which no alloying heat treatment was performed, the alloyed layer thickness ratio targeted in the present disclosure was not satisfied.

In Comparative Examples 7 and 8 in which the Ti or Zn content was out of the range of the present disclosure, the surface fractions and the ratios of a diameter of 4 μm or more of Ti and Zn targeted in the present disclosure were not satisfied due to excessive formation of the oxide. Thus, the pressure sensitive paper reacted area range showing the wear properties was not satisfied.

In Comparative Example 9 in which the Ti and Zn contents were out of the range of the present disclosure, the surface fractions and the ratios of a diameter of 4 μm or more of Ti and Zn targeted in the present disclosure were not satisfied due to excessive formation of the oxide. Thus, the mold wear resistance of the member was reduced.

Hereinabove, the present disclosure has been described in detail by the exemplary embodiments, but other exemplary embodiments having different forms are possible. Therefore, the technical spirit and scope of the claims set forth below are not limited by the exemplary embodiments.

The invention claimed is:

1. An aluminum-iron-based plated steel sheet comprising:
a base steel sheet; and
an aluminum-based plating layer on a surface of the base steel sheet,
wherein the aluminum-based plating layer comprises:
an alloyed layer on the surface of the base steel sheet; and
a pure aluminum layer on the alloyed layer,
wherein the alloyed layer is formed of one or more of $Fe_3Al$, $FeAl(Si)$, $Fe_2Al_5$, and $FeAl_3$,
wherein a thickness of the alloyed layer is 90% or more of a thickness of the aluminum-based plating layer,
wherein a surface fraction of Ti is 2% or less, excluding 0%, and a surface fraction of Zn is 1% or less, excluding 0%, as observed on the surface of the aluminum-based plating layer,
wherein a fraction of a circle-equivalent diameter of 4 μm or more of Ti is 20% or less, as observed on the surface of the aluminum-based plating layer; and
wherein a fraction of a circle-equivalent diameter of 4 μm or more of Zn is 20% or less, as observed on the surface of the aluminum-based plating layer.

2. The aluminum-iron-based plated steel sheet of claim 1, wherein the thickness of the aluminum-based plating layer is 20 to 40 μm and a plating amount on both surfaces is 20 to 200 $g/m^2$.

3. The aluminum-iron-based plated steel sheet of claim 1, wherein the base steel sheet includes, by weight: 0.04 to 0.5% of C, 0.01 to 2% of Si, 0.01 to 10% of Mn, 0.001 to 1.0% of Al, 0.05% or less of P, 0.02% or less of S, and 0.02% or less of N, with a balance of Fe and other unavoidable impurities.

4. The aluminum-iron-based plated steel sheet of claim 3, wherein the base steel sheet further includes, by weight, one or more of 0.01 to 4.0% of a sum of one or more selected from the group consisting of Cr, Mo, and W; 0.001 to 0.4% of a sum of one or more selected from the group consisting of Ti, Nb, Zr, and V; 0.005 to 2.0% of Cu+Ni; 0.001 to 1.0% of Sb+Sn; and 0.0001 to 0.01% of B.

5. The aluminum-iron-based plated steel sheet of claim 1, wherein when the aluminum-iron-based plated steel sheet is heated at 930° C. for 6 minutes and then is subjected to a high temperature wear test, a pressure sensitive paper reacted area of a mold is 50% or less,
wherein the high temperature wear test includes placing the heated aluminum-iron based plated steel sheet between molds, performing a drawing friction test in a range of 700 to 800° C. and inserting a pressure sensitive paper between the molds and pressing the pressure sensitive paper with a pressure of 5 MPa, and then measuring the reacted area by an image analyzer.

6. A hot press forming member obtained by hot press forming of the aluminum-iron-based plated steel sheet of claim 1.

7. The hot press forming member of claim 6, wherein on a surface of the member, a surface fraction of Ti is 5% or less, a fraction of a circle-equivalent diameter of 4 μm or more of Ti is 50% or less, a surface fraction of Zn is 5% or less, and a fraction of a circle-equivalent diameter of 4 μm or more of Zn is 50% or less.

8. The aluminum-iron-based plated steel sheet of claim 1, wherein the surface fraction of Ti is 0.19% to 2%, and the surface fraction of Zn is 0.04% to 1%, as observed on the surface of the aluminum-based plating layer.

* * * * *